United States Patent
Yang et al.

(10) Patent No.: US 9,014,718 B2
(45) Date of Patent: Apr. 21, 2015

(54) LOCATION SENSING USING CHANNEL FADING FINGERPRINTING

(75) Inventors: Lei T. Yang, Hillsboro, OR (US); Xue Yang, Arcadia, CA (US); Xingang Guo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 7 days.

(21) Appl. No.: 13/992,832

(22) PCT Filed: Dec. 8, 2011

(86) PCT No.: PCT/US2011/063885
§ 371 (c)(1),
(2), (4) Date: Jun. 10, 2013

(87) PCT Pub. No.: WO2013/085516
PCT Pub. Date: Jun. 12, 2013

(65) Prior Publication Data
US 2014/0194139 A1     Jul. 10, 2014

(51) Int. Cl.
*H04W 4/02* (2009.01)
*H04W 4/04* (2009.01)
*G01S 5/02* (2010.01)
*H04W 64/00* (2009.01)

(52) U.S. Cl.
CPC ............... *H04W 4/04* (2013.01); *G01S 5/0252* (2013.01); *H04W 64/00* (2013.01)

(58) Field of Classification Search
USPC ...................... 466/404.1, 404.2, 422.1, 456.1
See application file for complete search history.

(56) References Cited

U.S. PATENT DOCUMENTS

| 2005/0124354 | A1 | 6/2005 | Durgin |
| 2007/0133487 | A1 | 6/2007 | Wang et al. |
| 2010/0008337 | A1* | 1/2010 | Bajko ............................ 370/338 |

(Continued)

FOREIGN PATENT DOCUMENTS

| KR | 10-2008-0053116 A | 6/2008 |
| WO | 2013/085516 A1 | 6/2013 |

OTHER PUBLICATIONS

International Search Report and Written Opinion Received for PCT Application No. PCT/US2011/063885, mailed on Aug. 31, 2012, 9 pages.

(Continued)

*Primary Examiner* — Cong Tran
(74) *Attorney, Agent, or Firm* — Ellis B. Ramirez; Prass LLP (57) ABSTRACT

A system and method are provided for providing precise location sensing for wireless devices in an indoor environment using channel fading fingerprinting. An indoor environment within which wireless devices are used is surveyed to develop a channel fading database for the indoor environment. The surveying of the indoor environment determines a specific channel fading profile according to 30 subcarrier frequencies in a wireless signal for numerous locations within the indoor environment. A wireless device scans for available wireless access points and extracts a channel fading profile for a current location of the wireless device. The extracted channel fading profile for the current location of the wireless device is compared with the channel fading database. A best match comparison between the extracted channel fading profile and the channel fading database is used to determine an actual physical location of the wireless device in the indoor environment.

20 Claims, 3 Drawing Sheets

(56) References Cited

U.S. PATENT DOCUMENTS

| | | |
|---|---|---|
| 2010/0265093 A1 | 10/2010 | Cho et al. |
| 2012/0053472 A1* | 3/2012 | Tran .............................. 600/509 |
| 2012/0058778 A1* | 3/2012 | Waters et al. .............. 455/456.1 |
| 2012/0122487 A1* | 5/2012 | Holm et al. ................. 455/456.2 |
| 2012/0133555 A1* | 5/2012 | Hyun ....................... 342/357.31 |
| 2012/0208549 A1* | 8/2012 | Lau et al. ................... 455/456.1 |
| 2012/0315918 A1* | 12/2012 | Kadous ...................... 455/456.1 |
| 2013/0035109 A1* | 2/2013 | Tsruya et al. .............. 455/456.1 |

OTHER PUBLICATIONS

International Preliminary Report on Patentability and Written Opinion received for PCT Patent Application No. PCT/US2011/063885, mailed on Jun. 19, 2014, 6 pages.

* cited by examiner

LOCATION SENSING USING CHANNEL FADING FINGERPRINTING

BACKGROUND

1. Field of the Disclosed Embodiments

This disclosure relates to systems and methods for providing precise location sensing for wireless devices in an indoor environment using channel fading fingerprinting.

2. Related Art

In recent years, there has been an unprecedented increase in the numbers and types of wireless devices accessing all manner of wireless networks. These wireless devices are being loaded with increasingly capable libraries of applications that provide the wireless devices with the capacity to undertake all manner of tasks that far exceed simple communication between wireless devices via, for example, a wireless network to which the wireless devices have gained access.

Many of the applications that are being developed and implemented in wireless devices, and the wireless networks to which they are connected, benefit from an ability to identify a specific geographic location for a particular wireless device. These so called "location-based services" are provided in the wireless device based on the ability of the wireless device to identify its own geographic location.

Conventional position locating of a wireless device is often accomplished with reference to the Global Positioning Satellite (GPS) System. Most common wireless devices include a GPS receiver for precisely this purpose. A position of the wireless device that is determined by referencing a GPS signal is generally accurate to within about 50 feet (15 m). This accuracy may be enough for certain location based services in open areas. In order to take advantage of more advanced location-based services, particularly in indoor environments, more precise position locating accuracies for wireless devices are desired.

The requirement for more precise position accuracies increases with regard to indoor environment. When a wireless device is moved indoors, a first problem with which a user of the wireless device is confronted in attempting to obtain any positional reference is that the GPS, as the only globally available locating system, typically fails to work in the indoor environment. This is largely due to the comparatively weak signal strength of the satellite signals in the GPS system, or the indoor multi-path environment severely degrading GPS performance. Even if GPS satellite signals were available, however, a generic 50 foot precision to locating the wireless device with an available GPS signal would simply not be nearly accurate enough in an indoor environment.

There has previously been a body of research concerned with precise indoor position location undertaken for purposes other than locating wireless devices. Among the early indoor location sensing techniques that were attempted were techniques that relied on deploying specialized communications and sensing infrastructures within the particular indoor environment. Examples of the earliest attempts at indoor location sensing techniques in general included use of infrared beacons and/or ultrasound devices for providing accurate indoor localization. A significant drawback to these early solutions was in their specificity. Often, practical deployment of these types of indoor localization systems in a particular indoor environment was hindered by the significant costs in time and resources associated with the initial deployment and with the requirements for ongoing maintenance of such systems.

With the proliferation of wireless networks, such as, for example, Wi-Fi networks, indoor localization techniques for providing locations for wireless devices in the indoor environment have been separately studied. These techniques often make reference to Wi-Fi signal strengths, often referred to as Received Signal Strength Indication or RSSI, that are sensed by the wireless (Wi-Fi) receiver in the wireless devices. These techniques are often based on signal propagation models. Examples of these common techniques are Place Lab® and SkyHook®, which use Media Access Control addresses for nearby wireless access points to determine a position of a mobile device. These techniques, however, fail to meet modern accuracy requirements due to potentially large variations in signal strengths in indoor environments. These techniques are advertised to have location errors of approximately 20 m. Other techniques using Wi-Fi may may require extensive pre-use effort, for example, in building detailed maps or propagation models for multiple wireless access points based on surveys of a particular indoor environment. The basic approach in these techniques is based on a requirement to populate a database with signal strength fingerprints for each location in the indoor environment from multiple wireless access points. In fact, the greater the number of wireless access points, the better the accuracy of these signal strength mapping techniques. These signal strength fingerprints include, for example, a vector of received signal strength indication measurements from various available wireless access points for each location in the indoor environment. A particular wireless device is then localized by matching the observed signal strength readings against the signal strength fingerprint database. As indicated above, these schemes require considerable manual efforts to perform the detailed measurements across the indoor space and to maintain the signal map over time as they require access for the particular wireless device to multiple wireless access points. More sophisticated signal fingerprinting schemes have been attempted. One such scheme is described in a paper by Chintalapudi et al. entitled "Indoor Localization Without the Pain," (In Proc. of ACM Mobicom, 2010). The Chintalapudi technique also uses sets of signal strengths as the location signature. Even the more advanced signal strength based system discussed in the Chintalapudi paper, however, can only provide location accuracies in a range of several meters, making them still not accurate enough for certain more advanced mobile applications. Estimating more precise indoor location remains an unresolved problem.

SUMMARY OF THE DISCLOSED EMBODIMENTS

Commercial wireless application developers currently understand and deal with shortfalls in desired accuracy based in conventional systems by which a wireless device may identify its specific geographic position, particularly in an indoor environment. Precision location sensing in an indoor environment is, however, playing an increasingly critical role in pervasive and mobile computing. In order to make most beneficial use of higher-quality applications that benefit from accurate location sensing of a particular wireless device, there has emerged a need to more accurately pinpoint a position of the particular wireless device in the indoor environment. Applications that would benefit from additional accuracy from indoor location sensing may include a broad spectrum of new mobile applications directed at concepts such as location-based advertising, product finding and friend tracking.

In view of the above-identified shortfalls in the capacity of available systems to resolve wireless device position accuracies to less than, for example, several meters, it would be advantageous to provide a system and a method, using currently-available system technologies and infrastructures, that would provide a user of a wireless device with an ability to resolve a position of the user's wireless device to a sub-meter level. These systems and methods should obviate a requirement for use of highly-specialized equipment, access to extensive databases or communication with multiple wireless access points.

In various exemplary embodiments, the systems and methods according to this disclosure may provide a solution for the high precision indoor location sensing problem with regard to wireless devices, such as a commercially-available smartphones, tablets, PDAs and the like, by leveraging existing wireless network deployment, such as Wi-Fi, WiMAX or LTE. The systems and methods in this disclosure can be applied for Wi-Fi and/or LTE/WiMAX devices in similar ways. The specific wireless configurations and parameters (for example, 30 subcarriers in Wi-Fi) used in this disclosure should not be interpreted as being limited to any particular Wi-Fi or LTE/WiMAX configuration.

In various exemplary embodiments, the systems and methods according to this disclosure may provide improved indoor location sensing accuracy using frequency-selective channel fading profiles.

In various exemplary embodiments, the systems and methods according to this disclosure may leverage the fact that wireless signals experience frequency-selective channel fading in a multi-path environment. In other words, a wireless signal propagating through space does so along multiple paths experiencing different delays and attenuations among those paths. In various exemplary embodiments, the systems and methods according to this disclosure may make use of the location dependent property of channel fading based on multi-path reflections changing over a space resulting in different locations within the space having different frequency-selective fading profiles to resolve the location of wireless device to a localization granularity on the order of tens of centimeters.

In various exemplary embodiments, the systems and methods according to this disclosure may use the wireless (Wi-Fi, WiMAX, LTE) receiver in a particular wireless device with access to one or more wireless access points (or base stations) to resolve the accuracy of the particular wireless device to a sub-meter level without a requirement to add additional infrastructure to currently-deployed wireless network systems.

In various exemplary embodiments, the systems and methods according to this disclosure may be used to determine the location of the wireless device by establishing a channel fading database that correlates to a channel fading profile with a specific location. The systems and methods according to this disclosure may employ channel fading characteristics across different frequencies in order to produce a signature of a particular physical location in the indoor environment. An advantage of the systems and methods according to this disclosure is that the systems and methods are not dependent on communication with multiple wireless access points within the indoor space.

The systems and methods according to this disclosure present a solution that resolves a position of a wireless device using a channel fading profile fingerprint without requiring any infrastructure changes while improving location accuracy to the sub-meter level. These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for providing precise location sensing for wireless devices in an indoor environment using channel fading fingerprinting will be described, in detail, with reference to the following drawings, in which.

DETAILED DESCRIPTION OF THE DISCLOSED EMBODIMENTS

The systems and methods for providing precise location sensing for wireless devices in an indoor environment using channel fading fingerprinting according to this disclosure will generally refer to this specific utility for those systems and methods. Exemplary embodiments described and depicted in this disclosure should not be interpreted as being specifically limited to any particular configuration, or directed to any particular intended use. In fact, any detection and localization methodology for a wireless device that may benefit from the systems and methods according to this disclosure is contemplated.

Specific reference to, for example, any particular wireless device should be understood as being exemplary only, and not limited, in any manner, to any particular class of devices. The systems and methods according to this disclosure will be described as being particularly adaptable to being hosted on commercially-available hand-held wireless devices such as smartphones, tablets, PDAs and the like, but should not be considered as being limited to only these devices.

Individual features and advantages of the disclosed systems and methods will be set forth in the description that follows, and will be, in part, obvious from the description, or may be learned by practice of the features described in this disclosure. The features and advantages of the systems and methods according to this disclosure may be realized and obtained by means of the individual elements, and combinations of those elements, as particularly pointed out in the appended claims. While specific implementations are discussed, it should be understood that this is done for illustration purposes only. A person skilled in the relevant art will recognize that other components and configurations may be used without departing from the spirit and scope of the subject matter of this disclosure.

Various aspects of the disclosed embodiments relate to a system and a method for providing precise location sensing for wireless devices, particularly in an indoor environment, using channel fading fingerprinting, as well as a corresponding non-transitory computer-readable medium having recorded on it a program that, when executed by a processor causes the processor to execute the steps of the method for providing precise location sensing for wireless devices using channel fading fingerprinting.

Figure 1:
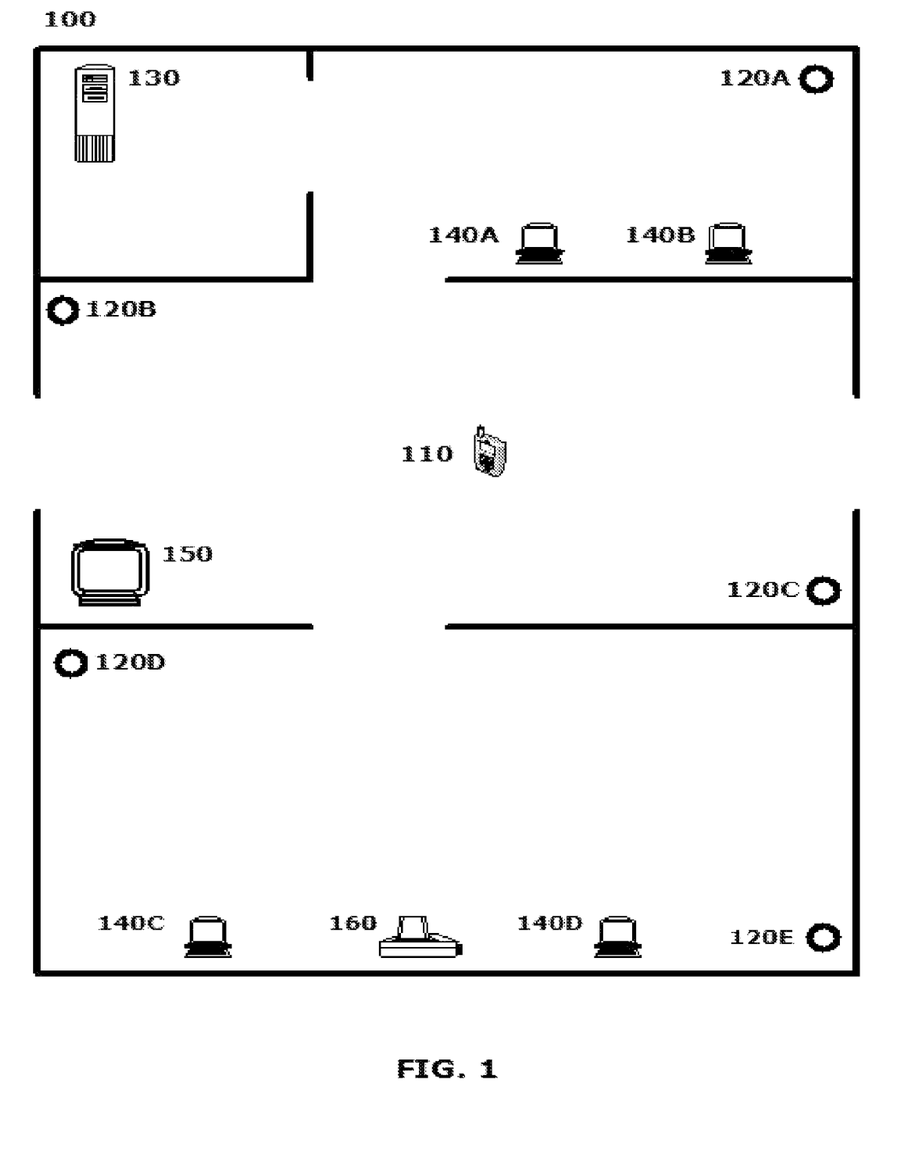
FIG. 1 illustrates a schematic diagram of an exemplary indoor environment with a wireless network within which the systems and methods according to this disclosure may operate.

FIG. 1 illustrates a schematic diagram of an exemplary indoor environment 100 with a wireless network within which the systems and methods according to this disclosure may operate. As shown in FIG. 1, the exemplary indoor environment 100 may include one or more computer servers and/or mainframes, shown as a single computer server 130.

The computer server 130 may operate in conjunction with any manner of peripheral devices. FIG. 1 depicts one exemplary configuration of the exemplary indoor environment 100 purely for illustration purposes. The exemplary indoor environment 100 may include, for example, some number of user workstations 140A-D; one or more monitoring devices, shown as a single monitoring device 150; and some number of dispersed printing devices, shown as a single printing device 160. Each of the particularly-disclosed peripheral devices 140A-D, 150 and 160 may be in wired or wireless communication with the server 130. Further, although depicted as being located within the exemplary indoor environment 100, it should be noted that the server 130 may be located remotely from, and be in either wireless or wired communication with, the exemplary indoor environment 100

The exemplary indoor environment 100 may include a plurality of wireless access points 120A-E by which the particularly disclosed peripheral devices 140A-D, 150 and 160 may wirelessly communicate with the server 130. The term "wireless access points," as used in this disclosure, should be understood to encompass related devices including, but not limited to, remotely-placed wireless base stations and eNodeBs usable with other network deployments. The plurality of wireless access points 120A-E may also provide access to the wireless network for one or more user wireless devices 110. Regardless of the specific configuration of the exemplary indoor environment 100, an objective of the systems and methods according to disclosure is to provide precise location sensing for the one or more user wireless devices 110 in an exemplary indoor environment 100 such as that depicted in FIG. 1.

The novel technique by which the systems and methods according to this disclosure may provide precise location sensing for the one or more user wireless devices 110 in the exemplary indoor environment 100 makes use of more detailed characteristics of a signal emanating from a wireless access point 120A-E. This technique makes effective use of frequency-selective channel fading profiles. For example, a 20 MHz channel emanating from a wireless access point is divided into 56 312.5 kHz bands called subcarriers. Each of the subcarriers sends independent data simultaneously. The technique does not look only at a single signal strength or RSSI value emanating from the wireless access points 120A-E, but rather looks at components of the many separate frequency subcarriers, e.g., 30 subcarriers. The ability of this technique to leverage information from a number of separate frequency subcarriers provides the more detailed granularity to the accuracy of the resultant fingerprint.

The particular wireless signal emanates through the exemplary indoor environment 100 via multiple paths according to each of the subcarriers, with each path experiencing different delays and attenuations. A phase of the wireless signal depends on a frequency of the wireless signal. Based on this, wireless signals received by a user wireless device 110 attenuate differently across the range of frequencies of the subcarriers. The technique recognizes that a particular wireless signal experiences frequency-selective channel fading in a multi-path environment. Because there are many multi-path reflections experienced by a particular wireless signal based on the various fixed and mobile obstructions within the exemplary indoor environment 100, components of indoor transmissions from one or more wireless access points 120A-E (Wi-Fi access points) display measurable frequency-selective fading patterns with particular attenuation differences across the subcarriers.

The disclosed techniques beneficially employ the location dependent property of the described channel fading profile to precisely locate a receiving user wireless device 110. In its multi-path reflections changing over the contours of the exemplary indoor environment 100, different locations within the exemplary indoor environment 100 experience significantly different frequency-selective fading profiles. These fading profiles potentially provide a localization granularity on the order of tens of centimeters.

In order to determine a location of a user wireless device 110, a channel fading database may be established. The channel fading database correlates individual channel fading profiles for specific physical locations within the exemplary indoor environment 100. A user wireless device 110 scans nearby wireless access points 120A-E and extracts channel fading profiles across different subcarriers from the one or more wireless access points 120A-E with which user wireless device 110 communicates. The user wireless device 110 matches the measured channel fading profile with the fading profile database to estimate a position of the user wireless device 110 using, for example, a "best match" methodology. Examples of "best match" methodologies include, for example, min-distance and/or maximum likelihood matching.

The current IEEE 802.11n standard (IEEE std. 802.11n-2009, published Oct. 29, 2009) includes Channel State Information (CSI) reporting that can be readily used by the user wireless device 110 to report fading profiles via a particular wireless access point 120A-E. The CSI can be configured to report channel status on each subcarrier, or once every 2 to 4 subcarriers to reduce reporting overhead. With such CSI reporting, the server 130 may be functionally merged with the wireless access point 120A-E.

The channel fading database for the exemplary indoor environment 100 may be constructed in an off-line phase. The channel fading database may contain detailed fading profiles measured for different locations throughout the exemplary indoor environment 100. The channel fading database may be stored in either of a user wireless device 110, or a server, such as server 130 shown in FIG. 1.

There are significant advantages to use of the above-described channel fading profile technique, and the database generated therefrom, over previous techniques using received signal strength indications from multiple wireless access points 120-A-E to generate a signature of a particular physical location within the exemplary indoor environment 100. Fading characteristics recorded across different subcarrier frequencies being used as a signature for a particular physical location within the exemplary indoor environment 100 provide localization accuracies that were previously unachievable using signal strength fingerprinting means. Further, these fading characteristic are not dependent on presence of multiple wireless access points 120A-E in the exemplary indoor environment 100. Signal strength fingerprinting, by contrast, depends on increasingly dense deployment of wireless access points 120A-E in order to provide location accuracy in the 2-3 m range. The systems and methods according to this disclosure, based around channel fading profiles, can provide sub-meter accuracies with reference to only a single wireless access point 120A-E.

As discussed briefly above, an additional advantage of the systems and methods according to this disclosure is that the technique can be implemented without any modification to current infrastructures.

Further, although the above discussion has focused on sub-carrier differences in a frequency domain, it should be noted that a channel fading profile may be differentiated in a time domain as well. That is, the channel fading profile variations can be captured in the time domain. Time domain discrimination can prove equally effective in populating the channel fading profile database discussed above, and in carrying into effect the method discussed below.

Figure 2:
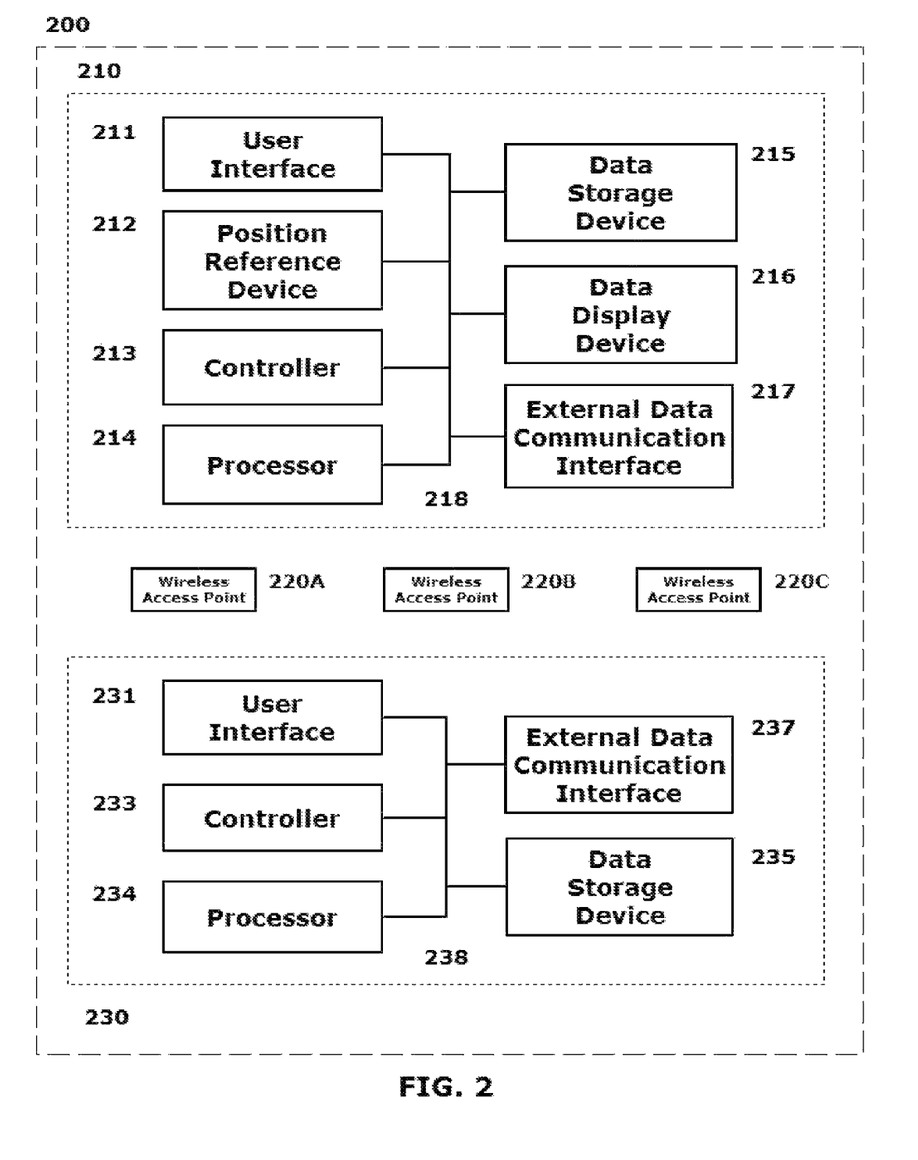
FIG. 2 illustrates a block diagram of an exemplary system for providing precise location sensing for wireless devices in an indoor environment using channel fading fingerprinting according to this disclosure.

FIG. 2 illustrates a block diagram of an exemplary system 200 for providing precise location sensing for wireless devices in an indoor environment using channel fading fingerprinting according to this disclosure. The exemplary system 200 may include one or more user wireless devices, shown as a single exemplary user wireless device 210, one or more wireless access points 220A-C and one or more servers, shown as a single exemplary server 230.

The user wireless device 210 may be, for example, a smartphone, tablet, PDA and like device. The user wireless device 210, in a common configuration, may include a user interface 211 by which the user can communicate with the user wireless device 210. The user interface 211 may be configured as one or more conventional mechanisms that permit a user to input information to the user wireless device 210. The user interface 211 may include, for example, an integral keyboard, or a touchscreen with "soft" buttons. The user interface 211 may alternatively include a microphone by which a user may provide oral commands to the user wireless device 210 to be "translated" by a voice recognition program or otherwise. The user interface 211 may otherwise include any other like device for user operation of, and data exchange with, the user wireless device 210.

The user wireless device 210 may include one or more position reference devices 212. Such position reference devices 212 may comprise, for example, a GPS receiver for receiving GPS location information to the user wireless device 210, and/or may include an inertial navigation system or other like device that can localize a position of the user wireless device 210 for use. The inclusion of a position reference device 212 is generally standard in the types of user wireless devices 210 contemplated by this disclosure. Such a conventional position reference device 212, however, is understood to suffer from the above-discussed shortfalls in (1) location accuracy, and (2) an inability to accurately provide position reference indoors.

The user wireless device 210 may include a controller 213 for controlling operation of the user wireless device 210. The user wireless device 210 may include one or more local processors 214 for individually undertaking determination processes that are carried out by the user wireless device 210, particularly the processing and control functions that will be described in detail below. Processor(s) 214 may include at least one conventional processor or microprocessor that interprets and executes instructions to execute the algorithms, and make the determinations according to the methods of this disclosure.

The user wireless device 210 may include one or more data storage devices 215. Such data storage device(s) 215 may be used to store data or operating programs to be used by the user wireless device 210, and specifically the controller 213 and the processor 214. Data storage device(s) 215 may include a random access memory (RAM) or another type of dynamic storage device that stores information and instructions for execution by the controller 213 and the processor(s) 214. Data storage device(s) 215 may also include a read-only memory (ROM), which may include a conventional ROM device or another type of static storage device that stores static information and instructions for the controller 213 and the processor(s) 214. The data storage device(s) 215 will generally be those that are integral to the user wireless device 210, and not some other data storage device, as will be described in detail below, that is provided external to, and in wireless communication with, the user wireless device 210.

At least one data storage device 215 may be configured to store a detailed channel fading database that is compiled by measuring channel fading profiles for a plurality of locations in the indoor environment in which the user wireless device 210 is operated. When such a channel fading database is stored locally in at least one data storage device 215 of the user wireless device 210, all of the determinations regarding comparing an extracted or observed channel fading profile for a current position of the user wireless device 210 with the detailed channel fading database stored locally, may be carried out locally by the one or more processors 214 within the user wireless device 210. In such an instance, the processor 214 in the user wireless device 210 may undertake, for example, the "best match" comparison described above, and with respect to the method outlined below.

The user wireless device 210 may include at least one data display device 216 which may be configured as one or more conventional mechanisms that display information to the user of the user wireless device 210 for alerting the user, for example, to a resolved position of the user wireless device 210 based on automated comparison of an extracted or observed channel fading profile for a current location of the user wireless device 210 with information stored in the channel fading database.

The user wireless device 210 may include one or more external data communication interfaces 217 by which the user wireless device 210 may communicate with components external to the user wireless device 210, such as the wireless access points 220A-C, and the wireless networks that may be accessed via those wireless access points 220A-C. External data communication interface(s) 217 may include any mechanism that facilitates direct communication, or communication via a network environment, for collection of data and sharing of results of processing undertaken by the user wireless device 210, in addition to the simple communicating functions of the user wireless device 210.

One of the external data communication interfaces 217 may be configured as a wireless receiver usable to detect signals from wireless access points. The external data communication interface 217 including the wireless receiver may be particularly configured to receive and resolve separate channel fading profiles of a number of separate frequency subcarriers from the wireless signal propagating from the one or more wireless access points 220A-C. In this regard, the external data communication interface 217 including the wireless receiver does more than simply assess a signal strength, e.g., Received Signal Strength Indication or RSSI, from the one or more wireless access points 220A-C.

The same, or another, external data communication interface 217 in the user wireless device 210 may be configured to specifically communicate an extracted or observed channel fading profile for a current location of the user wireless device 210 via one or more of the wireless access points 220A-C to the server 230 (a configuration of which will be discussed in greater detail below) for processing.

The one or more wireless access points (or base stations or eNodeBs) 220A-C shown in FIG. 2 may comport with the Wi-Fi standard for a 20 or 40 MHz signal broadcast on 56 or 112 subcarrier frequencies, or WiMAX/LTE standards for a 5 MHz, 10 MHz or 20 MHz signal with a range of subcarrier configurations. An ability of the user wireless device 210 to differentiate a channel fading profile for a number of, e.g. 30, subcarrier frequencies differentiates the systems and methods according to this disclosure from the prior art methods that relied only upon signal strength or RSSI measurements for multiple wireless access points (or base stations or eNodeBs) 220A-C.

The system 200 may include at least one server 230. The server 230 may include its own user interface 231, controller 233, processor 234, data storage device(s) 235 and external data communication interface 237. The components 231, 233, 234 will generally exhibit similar capabilities and carry out similar functions for the server 230 as their counterpart components 211, 213 and 214 carry out for the user wireless device 210. As such, common configurations and functioning to these components is presumed and will not be described further.

The server 230 may be in one of wired or wireless communication with the one or more wireless access points 220A-C via its own external data communication interface 237. This external data communication interface 237 may exhibit capabilities similar to the above-discussed external data communication interface 217 of the user wireless device 210.

At least one data storage device 235 may be configured to store a detailed channel fading database that is compiled by measuring channel fading profiles for a plurality of locations in the indoor environment in which a user wireless device 210 is intended to be operated. When such a channel fading database is stored in the at least one data storage device 235 of the server 230, the user wireless device 210 may collect information regarding an extracted or observed channel fading profile for a current location of the user wireless device 210. The user wireless device 210 may then communicate that information to the server 230 via one or more of the wireless access points 220A-C in the form of a query. The determinations regarding comparing the extracted or observed channel fading profile for the current location of the user wireless device 210 with the detailed channel fading database stored in the data storage device 235 of the server 230, may be carried out by the processor 234 in the server 230. In such an instance, the processor 234 in the server 230 may undertake, for example, the "best match" comparison described above, and with respect to the method outlined below. The server 230 may then communicate a result of the "best match" comparison to the user wireless device 210 as an actual location of the user wireless device 210 in the indoor environment.

For completeness, it should be recognized that, in each instance, all of the various components of the user wireless device 210 and of the server 230, as depicted in FIG. 2, may be connected by one or more data/control busses 218, 238, respectively. These data/control busses 218, 238 may provide internal wired or wireless communication between the various components of the user wireless device 210 and the server 230, as all of those components are housed integrally in the user wireless device 210 and the server 230.

It should be appreciated that, although depicted in FIG. 2 as an integral unit, the various disclosed elements of the server 230 may be arranged in any combination of sub-systems as individual components or combinations of components, integral to a single unit, or external to, and in wired or wireless communication with the single unit of the server 230. In other words, no specific configuration as an integral unit or as a support unit, for the server 230, alone or in its relation to the user wireless device 210, is to be implied by the depiction in FIG. 2.

The disclosed embodiments may include a method for providing precise location sensing for wireless devices in an indoor environment using channel fading fingerprinting. The method may include surveying an indoor environment within which one or more user wireless devices is intended to be used to develop a channel fading database for the indoor environment. Fingerprinting may be accomplished by known methods by which, for example, conventional RSSI fingerprinting is accomplished, except that significant additional information is collected for each measured location in the indoor environment. Fingerprinting may also be accomplished by some automatic procedure by which, for example, the channel fading profile associated with each location is automatically collected and accumulated over time. The channel fading database will, therefore, be populated with more detailed information regarding a particular wireless access point than a comparable database with information on signal strength values. An advantage of this method is that the overall amount of information collected for any single location in the indoor environment need not access multiple wireless access points. An objective of the surveying indoor environment is to determine a specific channel fading profile according to many of the subcarrier frequencies for numerous locations within the indoor environment. The method may include a user wireless device scanning for available wireless access points within the indoor environment. The method may include the user wireless device extracting or observing one or more channel fading profiles for a current location of the user wireless device in the indoor environment from the scanned available wireless access points. The method may include comparing the extracted or observed one or more channel fading profiles for the current location of the user wireless device in the indoor environment with the channel fading database. The method may apply a "best match" comparison between the extracted or observed one or more channel fading profiles for the current location of the user wireless device and the channel fading database to determine an actual physical location of the user wireless device in the indoor environment.

Figure 3:
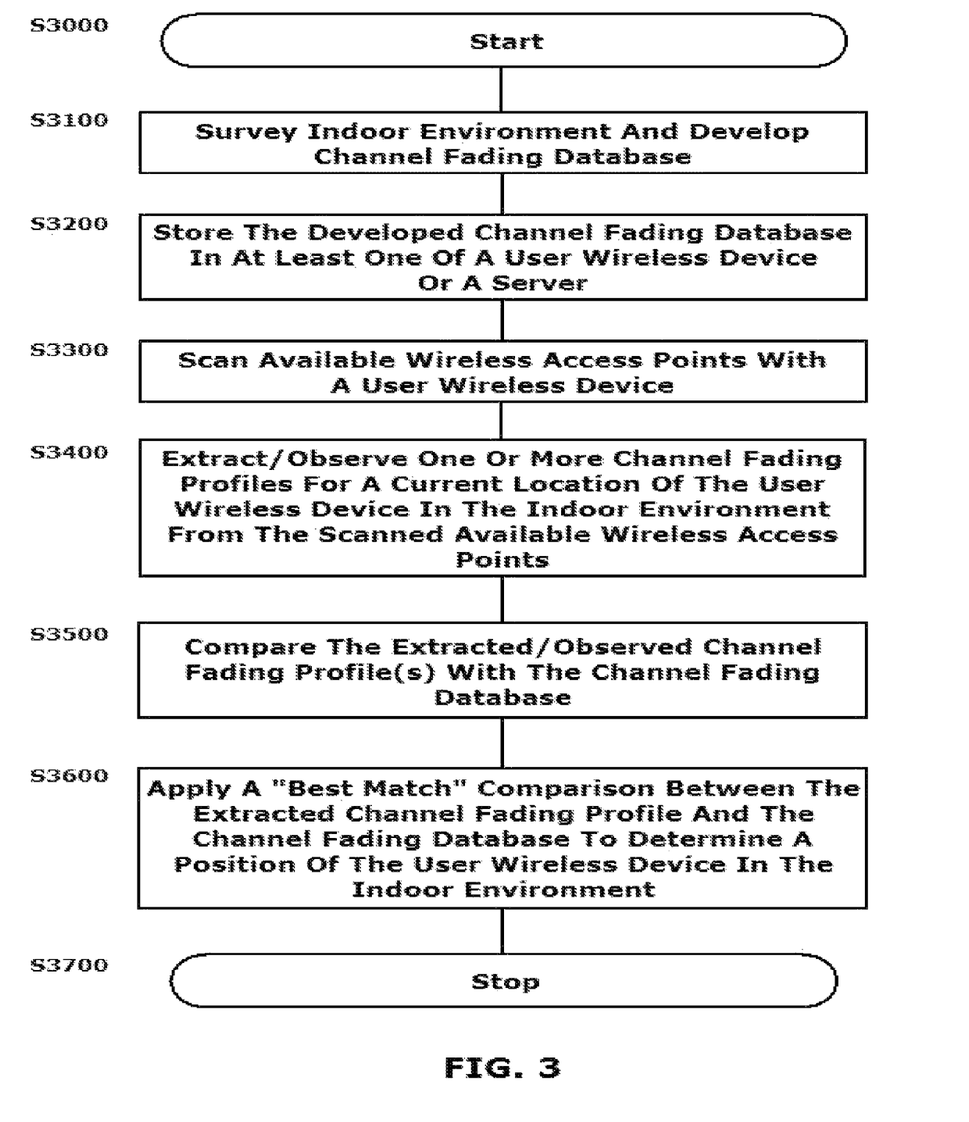
FIG. 3 illustrates a flowchart of an exemplary method for providing precise location sensing for wireless devices in an indoor environment using channel fading fingerprinting according to this disclosure.

FIG. 3 illustrates a flowchart of an exemplary method for providing precise location sensing for wireless devices in an indoor environment using channel fading fingerprinting according to this disclosure As shown in FIG. 3, operation of the method commences at Step S3000 and proceeds to Step S3100.

In Step S3100, an indoor environment may be surveyed according to known fingerprinting techniques. Fingerprinting may also be accomplished by some automatic procedure by which, for example, the channel fading profile associated with each location is automatically collected and accumulated over time. Instead of compiling data received via a wireless receiver to assess only a signal strength for each measured location, however, data regarding channel fading profiles across multiple subcarriers in a wireless signal is collected for each measured location. The current IEEE 802.11n standard includes Channel State Information (CSI) reporting, which can readily be used for user wireless devices reporting channel fading profiles across the 30 subcarriers to wireless access points. Operation of the method proceeds to Step S3200.

In Step S3200, the developed channel fading database may be stored in the data storage device. The developed channel fading database may be stored locally within the user wireless device, or remotely in one or more servers, or in any combination of these. Operation of the method proceeds to Step S3300.

In Step S3300, a user wireless device may scan one or more available wireless access points. Operation of the method proceeds to Step S3400.

In Step S3400, the user wireless device extracts or observes a local channel fading profile for a current location of the user wireless device in the indoor environment from the scanned one or more available wireless access points. Operation of the method proceeds to Step S3500.

In Step S3500, a comparison is made between the extracted or observed local channel fading profile for the current location of the user wireless device in the indoor environment to the stored channel fading database. If the channel fading database is stored locally in the user wireless device, this comparison, and further processing, may all be accomplished internal to the user wireless device. If the channel fading database is stored remotely, for example, in a remote server, this comparison, and further processing, may be accomplished by the remote server based on a query from the user wireless device. Operation of the method proceeds to Step S3600.

In Step S3600, regardless of location of the comparison, a "best match" comparison may be accomplished. The "best match" comparison may be any one of a known technique such as, for example, min-distance and/or maximum likelihood matching. If the processing was undertaken remotely in, for example, a remote server, the remote server may then transmit a resultant location for the user wireless device to the user wireless device. Operation of the method proceeds to Step S3700 where operation of the method ceases.

The disclosed embodiments may include a non-transitory computer-readable medium storing instructions which, when executed by a processor, may cause the processor to execute the steps of a method as outlined in Step S3200, and as described in detail in Step S3300, Step S3400, Step S3500, Step S3600, and Step S3700 above.

The above-described exemplary systems and methods reference certain conventional components to provide a brief, general description of a suitable communication and processing environment in which the subject matter of this disclosure may be implemented for familiarity and ease of understanding. Although not required, embodiments of the disclosure may be provided, at least in part, in a form of hardware circuits, firmware or software computer-executable instructions to carry out the specific functions described, such as program modules, being executed by a processor. Generally, program modules include routine programs, objects, components, data structures, and the like that perform particular tasks or implement particular data types.

Those skilled in the art will appreciate that other embodiments may be practiced in communication network environments with many types of communication equipment and computer system configurations, particularly in hand-held wireless devices, multi-processor systems, microprocessor-based or programmable consumer electronics, and the like.

Embodiments may also be practiced in distributed network communication environments where tasks are performed by local and remote processing devices, generally as outlined above, that are linked to each other by hardwired links, wireless links, or a combination of both through a communication network. In a distributed network environment, program modules may be located in both local and remote data storage devices.

Embodiments within the scope of the present disclosure may also include computer-readable media having stored computer-executable instructions or data structures that can be accessed, read and executed by the user wireless device using a compatible wireless data reader. Such computer-readable media can be any available media that can be accessed by a processor in, or in communication with, the user wireless device. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures. When information is transferred or provided over a network or another communications connection the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause a user wireless device, or a processor in such a user wireless device, to perform certain of the above-specified functions, individually, or in combination. Computer-executable instructions also include program modules that are remotely stored for access by a user wireless device to be executed by processors in the user wireless device when that device is caused to communicate in a network environment. The exemplary depicted sequence of executable instructions or associated data structures represents one example of a corresponding sequence of acts for implementing the functions described in the steps. The steps of the method, as depicted, are not intended to imply any particular order to the depicted steps except as may be necessarily inferred when one of the depicted steps is a necessary precedential condition to accomplishing another of the depicted steps.

Although the above description may contain specific details, they should not be construed as limiting the claims in any way. Other configurations of the described embodiments of the disclosed systems and methods are part of the scope of this disclosure. For example, the principles of the disclosure may be applied to each individual user where each user may individually deploy such a system. This enables each user to use the benefits of the disclosure even if any one of the large number of possible applications do not need a specific aspect of the functionality described and depicted in this disclosure. In other words, there may be multiple instances of the components each processing the content in various possible ways. It does not necessarily need to be one system used by all end users. Accordingly, the appended claims and their legal equivalents should only define the disclosure, rather than any specific examples given.

The invention claimed is:

1. A method for providing location sensing for wireless devices using channel fading fingerprinting, comprising:
scanning wireless access points with a receiving wireless device;
obtaining, with the receiving wireless device, a channel fading profile from at least one of the scanned wireless access points for a present location of the receiving wireless device;
comparing the obtained channel fading profile for the present location of the receiving wireless device with a database of channel fading profiles for surveyed locations in a vicinity of the receiving wireless device to determine an actual physical location of the receiving wireless device; and
outputting an indication of the actual physical location of the receiving wireless device based on the comparison;
wherein a channel fading profile is based on information about selected subcarriers of at least one wireless access point.

2. The method of claim 1, wherein:
the wireless access points are associated with a particular space; and
the method further comprises surveying the particular space to obtain channel fading profiles for a plurality of locations in the particular space from at least one of the wireless access points in a vicinity of each of the plurality of locations.

3. The method of claim 2, wherein the database of channel fading profiles is populated with the obtained channel fading profile associated with each of the plurality of locations in the particular space.

4. The method of claim 3, wherein:
the database of channel fading profiles is stored locally in the receiving wireless device, and
the comparing of the obtained channel fading profile for the present location of the receiving wireless device with the database of channel fading profiles to determine the actual physical location of the receiving wireless device and the outputting of the indication of the actual physical location of the receiving wireless device based on the comparison are performed by the receiving wireless device.

5. The method of claim 3, wherein:
the database of channel fading profiles is stored remotely in a server with which the receiving wireless device is in communication,
the comparing of the obtained channel fading profile for the present location of the receiving wireless device with the database of channel fading profiles to determine the actual physical location of the receiving wireless device is performed by the server based on a query from the receiving wireless device, and
the outputting of the indication of the actual physical location of the receiving wireless device based on the comparison comprises the server sending a signal to the receiving wireless device of a result of the comparison.

6. The method of claim 1, wherein the channel fading profile is based on assessing characteristics of a plurality of subcarriers making up a wireless signal emanating from at least one of the available wireless access points.

7. The method of claim 6, wherein the characteristics of the plurality of subcarriers are assessed in a frequency domain.

8. The method of claim 6, wherein the characteristics of the plurality of subcarriers are assessed in a time domain.

9. The method of claim 6, wherein the channel fading profile based on the characteristics of the plurality of subcarriers is obtained via a wireless receiver in the receiving wireless device.

10. The method of claim 1, wherein the comparing of the obtained channel fading profile for the present location of the receiving wireless device with the database of channel fading profiles for the surveyed locations in the vicinity of the receiving wireless device comprises employing a best match comparison.

11. The method of claim 10, wherein the best match comparison is at least one of a min-distance matching and a maximum likelihood matching.

12. A system for providing location sensing for a receiving wireless device using channel fading fingerprinting, comprising:
a receiving wireless device including a wireless receiver that scans wireless access points and obtains a channel fading profile from at least one of the scanned wireless access points for a present location of the receiving wireless device;
a storage device storing a database of channel fading profiles for surveyed locations in a particular area;
a processor that is programmed to compare the obtained channel fading profile for the present location of the receiving wireless device with the stored database of channel fading profiles; and
an output device that at least one of displays and outputs an indication of an actual physical location of the receiving wireless device based on a comparison undertaken by the processor;
wherein a channel fading profile is based on information about selected subcarriers of at least one wireless access point.

13. The system of claim 12, wherein:
the wireless access points are associated with a particular space; and
the database of channel fading profiles is populated with an obtained channel fading profile associated with each of a plurality of locations in the particular space.

14. The system of claim 13, wherein:
the receiving wireless device further comprises the storage device, the processor and the output device, and
the comparing of the obtained channel fading profile for the present location of the receiving wireless device with the database of channel fading profiles to determine the actual physical location of the receiving wireless device, and the outputting of the indication of the actual physical location of the receiving wireless device based on the comparison, are performed by the receiving wireless device.

15. The system of claim 13, wherein:
the storage device and the processor are located remotely in a server with which the receiving wireless device is in communication,
the comparing of the obtained channel fading profile for the present location of the receiving wireless device with the database of channel fading profiles to determine the actual physical location of the receiving wireless device is performed by the server based on a query from the receiving wireless device, and
the server sends a signal to the receiving wireless device as the output of the indication of the actual physical location of the receiving wireless device based on the comparison.

16. The system of claim 12, wherein the channel fading profile is based on assessing characteristics of a plurality of subcarriers making up a wireless signal emanating from at least one of the wireless access points in at least one of a frequency domain and a time domain.

17. The system of method of claim 16, wherein:
the plurality of subcarriers comprises various numbers of subcarriers, and
the receiving wireless device further comprises a wireless radio receiver that discerns the characteristics of the plurality of subcarriers.

18. The system of claim 12, wherein the processor compares the obtained channel fading profile for the present location of the receiving wireless device with the database of channel fading profiles for the surveyed locations in the vicinity of the receiving wireless device by employing a best match comparison.

19. The system of claim 18, wherein the best match comparison is at least one of a min-distance matching and a maximum likelihood matching.

20. A non-transitory computer-readable medium storing computer-readable instructions which, when executed by a processor, cause the processor to execute a method, comprising:
scanning wireless access points with a receiving wireless device;

obtaining, with the receiving wireless device, a channel fading profile from at least one of the scanned wireless access points for a present location of the receiving wireless device;

comparing the obtained channel fading profile for the present location of the receiving wireless device with a database of channel fading profiles for surveyed locations in a vicinity of the receiving wireless device to determine an actual physical location of the receiving wireless device; and outputting an indication of the actual physical location of the receiving wireless device based on the comparison;

wherein a channel fading profile is based on information about selected subcarriers of at least one wireless access point.

* * * * *